J. BIRKENHEAD,

Assignor to SAWYER SPINDLE COMPANY.

SPINDLE BEARING FOR SPINNING MACHINES.

No. 10,288. Reissued Feb. 20, 1883.

WITNESSES.

Wm. H. Draper

S. N. Piper

INVENTOR.

John Birkenhead

UNITED STATES PATENT OFFICE.

JOHN BIRKENHEAD, OF MANSFIELD, ASSIGNOR TO SAWYER SPINDLE COMPANY, OF BOSTON, MASSACHUSETTS.

SPINDLE-BEARING FOR SPINNING-MACHINES.

SPECIFICATION forming part of Reissued Letters Patent No. 10,288, dated February 20, 1882.

Original No. 205,718, dated July 9, 1878; Reissue No. 9,474, dated November 23, 1880. Application for reissue filed January 23, 1883.

*To all whom it may concern:*

Be it known that I, JOHN BIRKENHEAD, of Mansfield, of the county of Bristol, of the State of Massachusetts, have invented a new and useful Improvement in Spindle-Bearings for Spinning-Machines; and I do hereby declare the same to be described in the following specification and represented in the accompanying drawings, of which—

Figure 1:
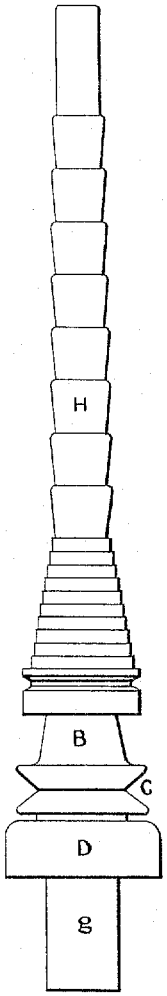
Figure 4:
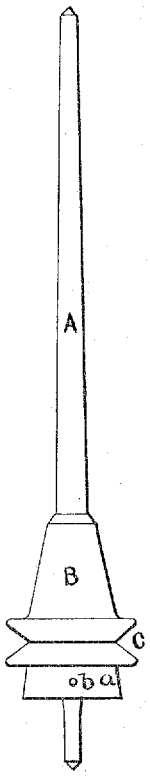
Figure 2:
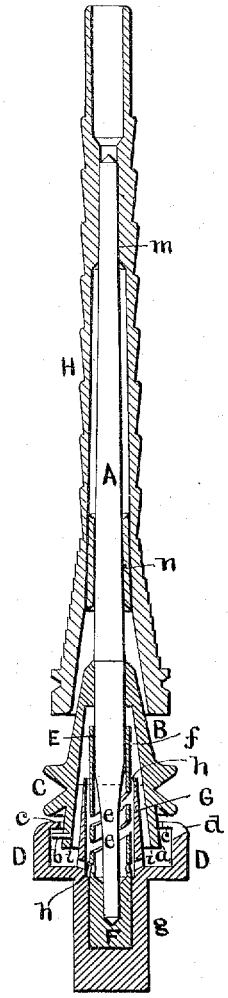
Figure 5:
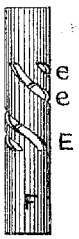
Figure 6:
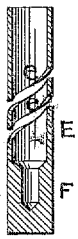
Figure 7:
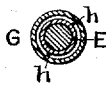
Figure 3:
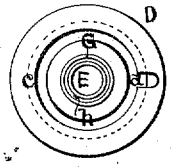

Figure 1 is a side elevation, and Fig. 2 a vertical section, of a live-spindle and its adjuncts embracing my invention, a bobbin being also exhibited as applied to the spindle. Fig. 3 is a top view of the oil trough or receiver. Fig. 4 is a side view of the live-spindle and the combined cap and whirl and stud, to be hereinafter explained. Fig. 5 is a side view, and Fig. 6 a vertical section, of the combined step and elastic bolster. Fig. 7 is a horizontal section taken through the spindle, bolster, and guard, to be hereinafter described.

In my improved spinning mechanism the spindle A extends up through and is fixed to a tapering or conical cap, B, to which the whirl C is applied, or makes part of it, as shown, the cap being extended below such whirl, as shown at *a*, and such extension being furnished with a short stud, *b*, to project from it externally. The said extension is to enter the mouth of the oil receiver or trough D, whose top is crowned, or flanged inward, as shown at *c*, and provided with a notch, *d*, for the stud *b* to pass through. This stud, while the spindle is in place and revolving, projects underneath the flange *c*, and with it serves to keep the spindle from rising in its bolster and step. This bolster (shown at E) is a tube projecting up from the step F, and is slotted, scored, or grooved helically above the step, as shown at *e e*, in order to render the bolster elastic laterally. The spindle has its upper bearing within the upper part of the bolster, as shown at *f*, while its foot rests on the step, which is secured firmly in the tenon *g* of the oil-receiver.

Extending upward from the bottom of the oil-receiver, and encompassing the elastic bolster, is the tubular guard or standard G, there being between it and the bolster a narrow intervening concentric space, *h*, which extends upward from the step. Within this space the bolster can move laterally, but by the guard will be prevented from being moved too far. This guard, while allowing a sufficient spring to the bolster, is to prevent the bolster from being bent laterally to its injury. The guard extends up within the cap B.

Through the lower part of the guard, and also through the bolster, there are passages, as shown at *i i*, for the oil to pass from the trough into the step.

The helical slits or grooves of the bolster, besides answering to render it elastic, serve to cause the oil, during revolution of the spindle, to pass up into the spindle-bearing of the bolster.

The cap B, by surrounding the spindle, bolster, and guard, serves not only to intercept any oil that may be thrown off laterally by the spindle, but to convey such oil back into the oil receiver.

It has been found in practice that with a rigid bolster the spindle does not operate so well, and is more liable to wear the bearing of the bolster than is the case with a bolster that is elastic or can spring laterally a little. Consequently I have so constructed the bolster, which, as shown, is directly fixed to or combined with the step. Thus the step and bolster-bearing have what may be termed an "elastic connection," to operate as described, the rigid guard surrounding this connection answering to limit the lateral movement of the bolster while the spindle may be revolving; or any force may be applied to the spindle to cause it to bend the bolster laterally.

What I claim as of my invention is as follows:

1. The combined step and elastic bolster, substantially as and for use as described.

2. The combination of the oil-reservoir with the connected step and the elastic bolster, essentially as specified.

3. The combination of the tubular standard or guard with the oil-receiver, the connected step, and the elastic bolster, all being arranged substantially as set forth.

4. The combination of the spindle and the elastic bolster, applied thereto as described, with the whirl-supporting cap, arranged to encompass such bolster and extend down within the oil-receiver, as set forth.

5. The combination of the spindle A, whirl-supporting cap B, elastic bolster E, step F, guard G, and oil-receiver D, all being arranged and applied substantially as shown and described.

JOHN BIRKENHEAD.

Witnesses:
WM. F. DRAPER,
S. N. PIPER.